United States Patent

[11] 3,581,228

[72] Inventor Peter W. Smith
    Little Silver, N.J.
[21] Appl. No. 737,881
[22] Filed June 18, 1968
[45] Patented May 25, 1971
[73] Assignee Bell Telephone Laboratories, Incorporated
    Murray Hill, N.J.

[54] SIMULTANEOUS TRANSVERSE AND LONGITUDINAL MODE LOCKING IN A LASER EMPLOYING AN ACTIVE ABSORPTION CELL
    8 Claims, 3 Drawing Figs.

[52] U.S. Cl. .................................................. 331/94.5
[51] Int. Cl. .................................................. H01s 3/02
[50] Field of Search ...................................... 331/94.5; 350/160

[56] References Cited
    UNITED STATES PATENTS
    3,321,714 5/1967 Tien ............................ 331/94.5

OTHER REFERENCES
Fox et al., " Mode-locked Laser and the 180° Pulse. Phys. Rev. Letters," Vol. 18, No. 20 (May 15, 1967) pp 826— 828
Garmire et al., " Laser Mode-locking with Saturable Absorbers. IEEE J. Quant. Elect.," Vol. QE-3, No. 6 (June 1967) pp 222—226

Primary Examiner—William L. Sikes
Attorneys—R. J. Guenther and Arthur J. Torsiglieri ABSTRACT: A laser that oscillates in multiple transverse and longitudinal modes is pulsed by a mutual adaptation of an absorption cell having a substantially matching absorption line and the other components of the laser to phase-lock simultaneously the traverse and longitudinal modes of the laser by saturable absorption. Simultaneous locking is accomplished provided that the laser resonator is designed such that the longitudinal mode separation frequency is an integral multiple of the transverse mode separation frequency.

PATENTED MAY 25 1971

3,581,228

INVENTOR
P. W. SMITH

BY David P. Kelley
ATTORNEY

SIMULTANEOUS TRANSVERSE AND LONGITUDINAL MODE LOCKING IN A LASER EMPLOYING AN ACTIVE ABSORPTION CELL

BACKGROUND OF THE INVENTION

This invention relates to techniques for pulsing lasers and more particularly to techniques for simultaneously phase-locking both the transverse and longitudinal modes of a laser.

It is sometimes remarked that lasers represent a solution in search of a problem. Nevertheless, it is known that a laser having appropriate characteristics is capable of solving a particular type of problem. For instance, it is presently believed that lasers might be most usefully employed in communication systems (e.g., a PCM system) when operated in a manner that provides pulses of very narrow width that can be interleaved in large numbers in order to reduce interpulse spacing.

One technique for providing such pulses involves synchronously modulating the longitudinal modes of a laser. Synchronous modulation may be either phase or loss modulation at the longitudinal mode separation frequency. Such modulation causes the longitudinal modes to phase-lock and to produce a time dependent energy distribution which is not limited in the transverse dimension within the laser aperture, but which, in the longitudinal dimension, is characterized by a pulse of energy which bounces back and forth between the resonator reflectors producing an output pulse every $2L/c$ seconds, where $c$ is the velocity of light and $2L$ is the round trip path length within the resonator.

For example, in the copending application of L. E. Hargrove, Ser. No. 362,319, filed Apr. 24, 1964 (now U.S. Pat. No. 3,412,251 issued on Nov. 19, 1968), and assigned to the assignee hereof, a technique is disclosed for pulsing a laser by synchronously modulating the loss of the resonator with an electro-optic modulator at the longitudinal mode spacing frequency $c/2L$. Pulsing at this rate, as previously mentioned, causes the longitudinal modes of the laser to phase-lock and produce a pulse train having re petition rate $c/2L$. The foregoing form of modulation is sometimes termed "loss modulation." It is also known that nonlossy or "reactive" techniques of modulation will produce laser pulsing.

It has recently been observed that lasers can pulse at the longitudinal mode separation frequency in the absence of any modulation or other deliberate perturbation of the laser. This pulsing has been termed self-pulsing. Most self-pulsing lasers have relatively long optical resonators, and, according to my analysis, the long resonators permit the population inversion of the active medium to recover between passages of the pulse. Nevertheless, the observed self-pulsing of lasers is not predictable and reliable and may easily switch to a regime of operation in which the longitudinal modes free-run and the output power is more or less continuous.

It has further been observed that, in a manner analogous to longitudinal mode-locking, the transverse modes of a laser phase-lock when phase or loss modulated at the transverse mode separation frequency. The time dependent energy distribution thus produced extends longitudinally the extent of the resonator but is limited transversely to a narrow region. The effect is therefore that of a spot of light which scans transversely across the resonator reflectors. See, for example, the copending application of I. P. Kaminow-P. W. Smith, Ser. No. 728,499, filed May 13, 1968, and assigned to applicant's assignee.

A recently developed theory shows that, in a self-pulsing laser, the pulses will be approximately "$\pi$ pulses" in the laser active medium. This terminology draws upon an analogy to the magnetic resonance art, where it is already known that a pulse of oscillating magnetic field of a certain strength and duration is effective to flip magnetic resonance dipoles in a material by exactly 180°. Such a pulse is termed a "$\pi$ pulse." The analogous laser pulse, in one passage through the laser medium, removes all available energy from the medium, leaving an excess of atoms in the lower energy level in the same amount by which there was initially an excess of atoms in the upper energy level. The initial upper level excess is then reestablished by the normal pumping process prior to the next passage of the pulse through the medium.

Other types of pulsed lasers have been developed which pulse at rates substantially lower than the longitudinal mode spacing rate. These techniques can generally be characterized as employing a bleachable absorption cell. The more common ones employ organic dye cells as the bleachable absorption cell. Recently, similar pulsing has been obtained in an absorption cell having discrete energy levels separated by the photon energy of the laser radiation. Such an arrangement employing a gallium arsenide injection laser and a gallium arsenide absorption cell is disclosed by Yu. A. Drozhbin et al. "Generation of ultraviolet Light Pulses with a GaAs Semiconductor Laser," Soviet Physics, JETP Letters, Volume 5, page 143, Mar. 15, 1967. For many applications, the lower pulsing rate thus obtained is inadequate.

SUMMARY OF THE INVENTION

It is an object of this invention to phase lock simultaneously both the longitudinal and transverse modes of a laser reliably and without an external modulation signal at either the transverse or longitudinal mode spacing frequency. The resultant time dependent energy distribution is limited in both the transverse and longitudinal dimensions to a pulse of energy which zigzags back and forth between the resonator reflectors producing an output pulse each time it strikes one of the reflectors which is made partially transmissive. In addition, the output pulse scans across the reflector and thus could be used to address an optical memory matrix.

According to the present invention, longitudinal mode-locking can be produced by using a saturable absorption cell in such a way that little energy is lost from the resonator to the absorption cell. More specifically, the laser pulses, which may be $\pi$ pulses for the laser active medium, could look like $\pi$ pulses or $2\pi$ pulses to the medium of the saturable absorption cell. By analogy with the preceding definition of a $\pi$ pulse, a $2\pi$ pulse is that pulse which twice flips the relative populations of two energy levels and returns the absorption cell to its initial condition at the end of every single passage therethrough. In addition, it is a feature of this invention that to achieve simultaneous phase-locking of both the longitudinal and transverse modes, the cavity resonator is preferably designed such that the longitudinal mode separation frequency is an integral multiple of the transverse mode separation frequency. Typically, the gas absorption cell may use the same gas as the lasing gas component of the laser active medium. For example, for a helium-neon laser operating at 6,328 Angstrom units, the absorption cell may employ pure neon at a pressure of approximately 3 Torr.

In one specific embodiment of my invention employing $2\pi$ pulse operation, there is provided (1) a cavity resonator designed such that $\Delta f_L = M \Delta f_T$, where $\Delta f_L$ and $\Delta f_T$ are respectively the longitudinal and transverse mode separation frequencies and $M$ is an integer, and (2) a mutual adaptation of the absorption cell and the other components of the laser to provide the necessary electric field strength to provide a $2\pi$ pulse in the absorption cell. For an absorption medium having an electric dipole moment, or oscillator strength, different from that of the active medium, the electric field needed for $2\pi$ pulse operation depends inversely upon the electric dipole moment of the absorption medium and is adjusted accordingly. Thus, the absorption cell passes a $2\pi$ pulse, as defined above. The $2\pi$ pulse "flips" the cell from an absorption condition to an inverted population condition; and then the cell "flips back" and returns the absorbed energy coherently to the pulse before it leaves the cell. Thus, the cell returns to its initial absorption condition at the end of every single pass of the pulse therethrough. The operation of the cell in this embodiment is characterized by the typical time delay of self-induced transparency, as described by S. L. McCall and E. L. Hahn, "Self-Induced Transparency by Pulsed Coherent Light," Physical Review Letters, pages 908—911, May 22, 1967. The appropriate electric field strength in the absorption cell is provided by appropriate shaping of the beam, illustratively by focusing. The location of the active absorption cell within the laser optical resonator in this embodiment is noncritical. Therefore, this embodiment can optionally take the form of a ring laser.

BRIEF DESCRIPTION OF THE DRAWING

The invention, together with its objects, features and advantages, can be easily understood from the following more detailed description taken in conjunction with the accompanying drawing, in which.

DESCRIPTION OF ILLUSTRATIVE EMBODIMENTS

Figure 1:
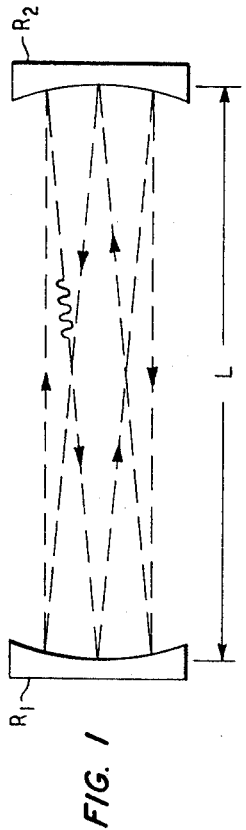
FIG. 1 is a schematic of a cavity resonator showing a typical zigzag path of a pulse of energy in a laser in which both the longitudinal and transverse modes are simultaneously phase-locked.

Before discussing the invention in detail, it will be helpful to describe the design of the cavity resonator employed in accordance with the principles of the invention in order to achieve simultaneous transverse and longitudinal mode-locking. The basic requirement is that the resonator, as shown in FIG. 1, be designed such that the longitudinal mode separation frequency $\Delta f_L$ be an integral multiple M of the transverse mode separation frequency $\Delta f_T$, i.e., $$\Delta f_L = M \Delta f_T. \quad (1)$$

In a resonator formed by a pair of concave mirrors of radii $R_1$ and $R_2$ and separated by distance L, equation (1) is satisfied to a high degree of approximation if $$\Delta f_T = \Delta f_L \frac{\cos^{-1}\sqrt{g_1 g_2}}{\pi} \quad (2)$$

where $$g_1 = 1 - \frac{L}{R_1} \text{ and } g_2 = 1 - \frac{L}{R_2} \quad (3)$$

In such a resonator a nonlinear absorbing medium, as will be more fully described hereinafter, produces a time dependent energy distribution characterized by a pulse of energy which zigzags back and forth between the reflectors. The pulse of energy thus produces an output pulse each time it is incident upon a partially transmissive reflector and due to the zigzag motion transversely scans across the reflector. In the following discussion it will be assumed that all embodiments employ a resonator which satisfies equation (1).

Figure 2:
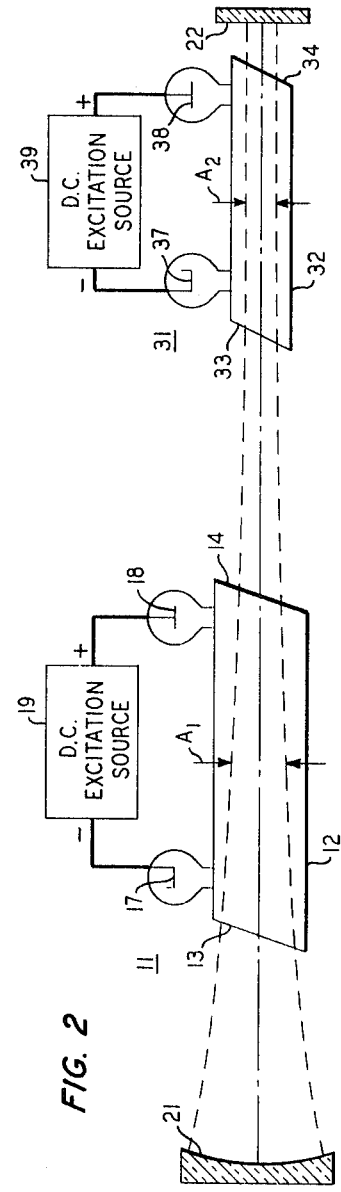
FIG. 2 is a partially pictorial and partially block diagrammatic illustration of one embodiment of the invention.

In FIG. 2 the illustrated apparatus produces laser pulses according to one embodiment of the invention in which the active medium of a laser 11 transmits pulses like those of a self-pulsing laser while an active absorption cell responds to the pulses as $2\pi$ pulses.

The active gain medium is illustratively a mixture of helium and neon in a ratio of 5:1 and is capable of laser oscillation at 6,328 Angstrom units. It is contained in a suitable cylindrical tube 12 having Brewster angle end windows 13 and 14. The active gain medium is excited, or pumped, by means of a direct-current electrical discharge between cathode 17 and anode 18 connected across a direct-current voltage source 19. The laser active medium is disposed in a linear optical resonator comprising reflectors 21 and 22 disposed along an axis coinciding with the axis of tube 12. The respective curvatures of reflectors 21 and 22 are adapted so that the mean diameter of the beam in the vicinity of reflector 22, i.e., the diameter $A_2$ is such as to obtain $2\pi$ pulses in the absorption cell. The active gain medium is disposed so that it experiences the mean diameter $A_1$.

An active absorption cell 31 includes a gaseous medium of neon and is disposed in tube 32 to experience the mean diameter $A_2$ of the beam. Tube 32 has Brewster angle end windows 33 and 34. The cell 31 also includes a cathode 37 and an anode 38 and a direct-current voltage source 39 connected between electrodes 37 and 38. It will be noted that the upper and lower levels providing the absorption are respectively the same as the upper and lower levels of the lasing transition of the active medium in tube 12.

The total pressure of the active medium within the laser tube 12 is illustratively 1 Torr, the discharge length is illustratively 100 centimeters and the excitation power level is illustratively 30 watts. These parameters for the laser active medium can all be varied within the ranges known in the laser art.

Illustratively, the pressure in tube 32 is 3 Torr. Successful operation has been obtained at this pressure. Its length is illustratively 30 centimeters. Its excitation power is illustratively 10 watts. The spacing between end window 34 and reflector 22 is noncritical.

The typical radius of curvature of reflector 21 is 200 centimeters; and reflector 22 is illustratively substantially flat. Reflector 21 is partially transparent to permit the extraction of a portion of the laser oscillation. The spacing between reflectors 21 and 22 is illustratively somewhat less than 200 centimeters.

In operation of the embodiment of FIG. 2, the presence of the saturable active absorption cell 31 induces simultaneous phase-locking of both the longitudinal and transverse modes supported by the resonator, the active medium of laser 11 and its pumping means. The pumping means should supply sufficient power to permit a plurality of transverse and longitudinal modes to oscillate.

In the embodiment of FIG. 2, simultaneous phase-locking produced reliably by the cooperation of the normal components of a self-pulsing laser, the cavity resonator design and the added active absorption cell 31. The pulses obtained can be substantially shorter than those obtained from a self-pulsing laser. Moreover, this pulsing is obtained without the complexities and power losses of a crystal modulator and its driving circuitry.

The absorption cell 31 presents to the laser beam a temporary absorption (loss or negative gain) which may be considerably lower than the gain provided by the active medium of laser 11. The negative gain is provided by a larger initial population of atoms in the lower level than in the upper level. This is provided by a substantially pure neon discharge.

More specifically, the operation of the embodiment of FIG. 2 takes advantage of beam shaping by the reflectors 21 and 22 to provide some diameter ratio (e.g., 2:1 between the portion of the beam in the laser active medium and the portion of the beam in the active absorption cell medium, respectively. This ratio is such that the pulse in the cavity is a $2\pi$ pulse in the absorption cell 31 and the cell absorbs very little power. A $2\pi$ pulse first excites, then deexcites the absorbing atoms, leaving them in the lower level. The $2\pi$ pulse passes with little attenuation but with some characteristic delay, strikes the reflector 22, is returned, and again passes through without substantial attenuation.

In absorption cell 31, the number of lower state (absorbing atoms) will be determined by the discharge current, since in the absence of a discharge, the lower laser level, as well as the upper laser level, is negligibly populated. This characteristic of a three-level laser medium used as the saturable absorber should allow considerably flexibility in the design parameters. Little loss of the laser radiation occurs in the absorption cell 31 because its homogeneous dephasing lifetime is substantially greater than the pulse width. It is expected that this relationship can be readily obtained in gases and other absorbing media having inhomogeneously broadened absorption lines. Inhomogeneous broadening is a broadening of the gain curve or absorption loss curve, in this case, such that depleting the gain at one frequency does not substantially deplete the available absorption at other frequencies relatively widely separated from the one frequency within the broadened curve. Nevertheless, the invention is not limited to inhomogeneously broadened absorption media.

Figure 3:
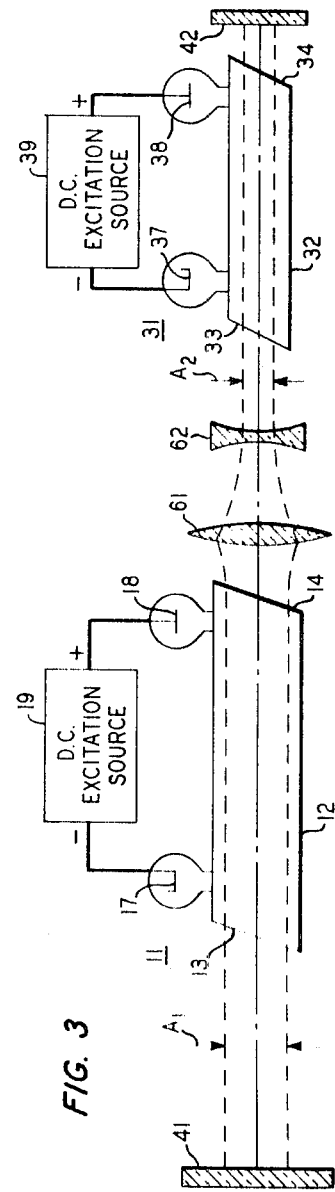
FIG. 3 is a partially pictorial and partially block diagrammatic illustration of a modification of the embodiment of FIG. 2 employing lenses.

Exactly the same mode of operation can be achieved in an optical resonator having reflectors 41 and 42 that are both substantially flat, as shown in the modified embodiment of FIG. 3. In FIG. 3, the relative diameter ratio of the beam in the laser 11 and the absorption cell 31 can be achieved by lenses 61 and 62 disposed within the optical resonator along the axis thereof. The lenses 61 and 62 are illustratively disposed between the laser 11 and the active absorption cell 31 and provide essentially parallel beams through both the laser 11 and the absorption cell 31. A single lens in any suitable position in the optical resonator will suffice if one wishes to permit a more divergent beam in at least one of the two tubes 12 and 32.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

I claim:

1. In a laser which simultaneously oscillates in a plurality of transverse and a plurality N of longitudinal modes and which includes an active gain medium capable of stimulated emission of coherent radiation, means for pumping said active medium, and a cavity resonator of length L including said medium and supporting said modes; the improvement comprising:
   means for constraining the radiation within said resonator so that the longitudinal mode separation frequency $\Delta f_L$ is an integral multiple M of the transverse mode separation frequency $\Delta f_L$, and
   an absorption cell disposed within said resonator, said cell comprising an absorbing medium having energy levels at least two of which are separated by approximately the photon energy of the coherent radiation of said active gain medium,
   whereby said absorption cell induces simultaneous phase-locking of both the longitudinal and transverse modes supported by said resonator.

2. The optical apparatus of claim 1 wherein said resonator comprises concave reflectors of radii $R_1$ and $R_2$ and satisfying the relationship $$\frac{\Delta f_T}{\Delta f_L} = \frac{1}{M} = \frac{\cos^{-1}\sqrt{g_1 g_2}}{\pi}$$

where $$g_1 = 1 - \frac{L}{R_1} \text{ and } g_2 = 1 - \frac{L}{R_2}$$

3. The optical apparatus of claim 1 in combination with means for providing in said absorbing medium a population of the lower of the two levels greater than the population of the upper of the two levels by an amount still permitting laser oscillation, said cell being disposed and mutually adapted with respect to the other components of said laser to absorb energy from a pulse of said radiation and then return the energy to said pulse at least once for every two passes of said pulse through said cell.

4. Optical apparatus according to claim 1 in which electric field strengths and electric dipole moments in the absorption medium are mutually adjusted for $2\pi$ pulse operation.

5. Optical apparatus according to claim 1 in which the mutual adaptation of the absorption cell and the other components of the laser comprises a gaseous absorbing medium, said absorbing medium having a pressure equal to or less than a value providing a homogeneous dephasing lifetime greater than the pulse width.

6. Optical apparatus according to claim 5 in which the mutual adaptation of the cell and the other components of the laser include means within the laser for providing an electric field strength of the radiation in said active absorption cell medium that is adjusted relative to the field strength of said radiation in the laser active medium and the electric dipole moments of said media for $2\pi$ pulse operation, whereby the absorption cell absorbs energy from said radiation and then returns the absorbed energy to said radiation during every single pass of said radiation through said absorption cell.

7. Optical apparatus according to claim 6 in which the electric field strength providing means comprises at least one lens disposed between the laser active gain medium and the active absorption cell medium to focus the radiation in said active absorption cell medium to a cross-sectional diameter sufficient to obtain $2\pi$ pulse operation.

8. Optical apparatus according to claim 6 in which the electric field strength providing means includes an adaptation of the resonating means in which focusing reflectors produce a beam of said radiation having a first diameter in a first locality and a second diameter in a second locality, the electric field strength providing means further comprising disposition of the laser active gain medium in the first locality and the active absorption cell medium in the second locality.

UNITED STATES PATENT OFFICE
CERTIFICATE OF CORRECTION

Patent No. 3,581,228          Dated May 25, 1971

Inventor(s) Peter W. Smith

It is certified that error appears in the above-identified patent and that said Letters Patent are hereby corrected as shown below:

Column 2, line 56, change "$\Delta f_L = M\Delta f$" to --$\Delta f_L = M\Delta f_T$--.

Column 3, line 33, change "$\Delta fL$" to --$\Delta f_L$--.

Column 3, equation (1), change "$\Delta f_L = M\Delta_T$" to "$\Delta f_L = M\Delta f_T$--.

Column 3, equation 2, change "cos-1" to --$\cos^{-1}$--.

Column 4, line 66, change "considerably" to --considerable--.

Column 6, line 1, change "cos-1" to --$\cos^{-1}$--.

Signed and sealed this 13th day of June 1972.

(SEAL)
Attest:

EDWARD M. FLETCHER, JR.          ROBERT GOTTSCHALK
Attesting Officer                Commissioner of Patents